United States Patent
Ortalda et al.

(10) Patent No.: US 8,148,437 B2
(45) Date of Patent: Apr. 3, 2012

(54) INTEGRAL POLYURETHANE FOAMS COMPRISING DIALKYL CYCLOHEXANEDICARBOXYLATES AS INTERNAL MOLD RELEASE AGENT

(75) Inventors: Marco Ortalda, Turin (IT); Tony Spitilli, Turin (IT)

(73) Assignee: BASF SE, Ludwigshafen (DE)

( * ) Notice: Subject to any disclaimer, the term of this patent is extended or adjusted under 35 U.S.C. 154(b) by 80 days.

(21) Appl. No.: 12/742,267

(22) PCT Filed: Nov. 25, 2008

(86) PCT No.: PCT/EP2008/066119
§ 371 (c)(1),
(2), (4) Date: May 11, 2010

(87) PCT Pub. No.: WO2009/068515
PCT Pub. Date: Jun. 4, 2009

(65) Prior Publication Data
US 2010/0286297 A1  Nov. 11, 2010

(30) Foreign Application Priority Data
Nov. 26, 2007 (EP) .................................. 07121515

(51) Int. Cl.
*C08J 9/34* (2006.01)
(52) U.S. Cl. .......... 521/51; 521/130; 521/137; 521/139; 521/170; 521/172; 521/174
(58) Field of Classification Search ............. 521/51, 521/130, 170, 137, 139, 172, 174
See application file for complete search history.

(56) References Cited

U.S. PATENT DOCUMENTS

| | | | |
|---|---|---|---|
| 3,304,273 A | 2/1967 | Stamberger | |
| 3,383,351 A | 5/1968 | Stamberger | |
| 3,440,224 A | 4/1969 | Impola et al. | |
| 3,523,093 A | 8/1970 | Stamberger | |
| 3,615,972 A | 10/1971 | Morehouse et al. | |
| 4,324,867 A * | 4/1982 | Patton et al. | 521/159 |
| 4,487,853 A | 12/1984 | Reichel et al. | |
| 4,764,537 A | 8/1988 | Horn et al. | |
| 4,994,502 A * | 2/1991 | Markovs et al. | 521/137 |
| 5,700,869 A * | 12/1997 | Turnbach | 524/731 |

FOREIGN PATENT DOCUMENTS

| | | |
|---|---|---|
| DE | 111 394 | 7/1899 |
| DE | 1 152 536 | 8/1963 |
| DE | 1 152 537 | 8/1963 |
| DE | 36 07 447 | 9/1987 |
| DE | 103 03 172 | 7/2004 |
| EP | 0 153 639 | 9/1985 |
| EP | 0 250 351 | 12/1987 |
| EP | 0 297 519 | 1/1989 |
| WO | 2005 098763 | 10/2005 |

OTHER PUBLICATIONS

International Search Report issued Mar. 3, 2009 in PCT/EP 08/066119 filed Nov. 25, 2008.

* cited by examiner

*Primary Examiner* — John Cooney
(74) *Attorney, Agent, or Firm* — Oblon, Spivak, McClelland, Maier & Neustadt, L.L.P.

(57) ABSTRACT

The present invention relates to a process for producing integral polyurethane foams, in which a) organic polyisocyanates are mixed with b) relatively high molecular weight compounds having at least two reactive hydrogen atoms, c) blowing agents, d) dialkyl cyclohexanedicarboxylates and, if appropriate, e) chain extenders and/or crosslinkers, f) catalysts and g) other auxiliaries and/or additives to form a reaction mixture, the reaction mixture is introduced into a mold and allowed to react to form an integral polyurethane foam. The present invention further relates to integral polyurethane foams comprising dialkyl cyclohexanedicarboxylates, the use of such foams in the interior of road vehicles or as shoe soles and the use of dialkyl cyclohexanedicarboxylates as internal mold release agents in the production of integral polyurethane foams.

13 Claims, No Drawings

INTEGRAL POLYURETHANE FOAMS COMPRISING DIALKYL CYCLOHEXANEDICARBOXYLATES AS INTERNAL MOLD RELEASE AGENT

The present invention relates to a process for producing integral polyurethane foams, in which a) organic polyisocyanates are mixed with b) relatively high molecular weight compounds having at least two reactive hydrogen atoms, c) blowing agents, d) dialkyl cyclohexanedicarboxylates and, if appropriate, e) chain extenders and/or crosslinkers, f) catalysts and g) other auxiliaries and/or additives to form a reaction mixture, the reaction mixture is introduced into a mold and allowed to react to form an integral polyurethane foam. The present invention further relates to integral polyurethane foams comprising dialkyl cyclohexanedicarboxylates, the use of such integral polyurethane foams in the interior of road vehicles or as shoe soles and the use of dialkyl cyclohexanedicarboxylates as internal mold release agents in the production of integral polyurethane foams.

Further embodiments of the present invention are described in the claims, the description and the examples. It goes without saying that the features mentioned above and those still to be explained below of the subject matter of the invention can be employed not only in the combination indicated in each case but also in other combinations, without going outside the scope of the invention.

Integral polyurethane foams are polyurethane moldings having a compact surface and a cellular core. Integral polyurethane foams and their production have been known for a long time and are described, for example, in Modern Shoemaking No. 61: Solings, November 2001, Stephen Abbott and Mike George, Satra Technology Centre 2001. Integral polyurethane foams are used in various fields. A typical use is as shoe sole, for example for street shoes, sports shoes, sandals and boots, and also in the field of automobile interiors, for example as steering wheels, headrests or transmission knobs. Further possible applications are as arm rests of chairs or as motorcycle saddles.

The reaction mixture for producing integral polyurethane foams usually comprises internal mold release agents so that the moldings produced can be removed more easily from the mold. This also avoids defects on the integral polyurethane foam which can occur as a result of adhesion to the mold. Known internal mold release agents are dimethylsiloxanes, esters of saturated or unsaturated, long-chain fatty acids, e.g. esters of stearic acid or oleic acids and dialkyl phthalates.

The addition of polydimethylsiloxanes or fatty acid esters to the reaction mixture for producing integral polyurethane foams interferes in foam formation. The use of these internal mold release agents leads to undesirably large cells and impairs the formation of the compact outer skin which is important for the integral polyurethane foams. Furthermore, the mechanical properties of the integral foam, e.g. hardness, tensile strength and elongation at break and also the hydrolysis behavior, are adversely affected.

Dialkyl phthalates are highly effective mold release agents which do not display the abovementioned adverse effects on the cell structure and the skin formation in integral polyurethane foams. However, their use is partly prohibited for environmental and health reasons.

It was therefore an object of the present invention to provide a process for producing integral polyurethane foams, in which the cell structure and the formation of the external skin of the integral polyurethane foams to be produced are not adversely affected.

It was likewise an object of the present invention to provide integral polyurethane foams which have excellent mechanical properties such as hardness, tensile strength and maximum elongation at break, even after aging under hydrolytic conditions.

The object of the invention has surprisingly been achieved by a process in which a) organic polyisocyanates are mixed with b) relatively high molecular weight compounds having at least two reactive hydrogen atoms, c) blowing agents, d) dialkyl cyclohexanedicarboxylates and, if appropriate, e) chain extenders and/or crosslinkers, f) catalysts and g) other auxiliaries and/or additives to form a reaction mixture, the reaction mixture is introduced into a mold and allowed to react to form an integral polyurethane foam.

Furthermore, the object of the invention is achieved by an integral polyurethane foam which can be obtained by a process according to the invention.

For the purposes of the invention, integral polyurethane foams are polyurethane foams in accordance with DIN 7726 having a surface zone, which, due to the shaping process, has a higher density than the core. The overall foam density averaged over the core and the surface zone is preferably above 0.08 $g/cm^3$, particularly preferably from 0.15 to 0.80 $g/cm^3$ and in particular from 0.25 to 0.70 $g/cm^3$.

The organic and/or modified polyisocyanates (a) used for producing the integral polyurethane foams of the invention comprise the aliphatic, cycloaliphatic and aromatic divalent or polyvalent isocyanates known from the prior art (constituent a-1) and any mixtures thereof. Examples are methanediphenyl 4,4'-diisocyanate, methanediphenyl 2,4'-diisocyanate, mixtures of monomeric methanediphenyl diisocyanates and homologues of methanediphenyl diisocyanate having more than two rings (polymeric MDI), tetramethylene diisocyanate, hexamethylene diisocyanate (HDI), isophorone diisocyanate (IPDI), tolylene 2,4- or 2,6-diisocyanate (TDI) or mixtures of the isocyanates mentioned.

Preference is given to using 4,4'-MDI. The 4,4'-MDI which is preferably used can comprise from 0 to 20% by weight of 2,4' MDI and small amounts, up to about 10% by weight, of allophanate- or uretonimine-modified polyisocyanates. It is also possible to use small amounts of polyphenylenepolymethylene polyisocyanate (polymeric MDI). The total amount of these high-functionality polyisocyanates should not exceed 5% by weight of the isocyanate used.

The polyisocyanate component (a) is preferably used in the form of polyisocyanate prepolymers. These polyisocyanate prepolymers can be obtained by reacting polyisocyanates as described above (a-1) with polyols (a-2), for example at temperatures of from 30 to 100° C., preferably about 80° C., to form the prepolymer.

Polyols (a-2) are known to those skilled in the art and are described, for example, in "Kunststoffhandbuch, volume 7, Polyurethane", Carl Hanser Verlag, 3rd edition 1993, chapter 3.1. As polyols (a-2), preference is given to using the high molecular weight compounds having hydrogen atoms which are reactive toward isocyanates as described under b).

If appropriate, customary chain extenders or crosslinkers are added to the abovementioned polyols in the preparation of the isocyanate prepolymers. Such substances are described below under e).

Relatively high molecular weight compounds b) having at least two hydrogen atoms which are reactive toward isocyanate groups can be, for example, polyetherols or polyesterols.

Polyetherols are prepared by known methods, for example from one or more alkylene oxides having from 2 to 4 carbon atoms in the alkylene radical by anionic polymerization using alkali metal hydroxides or alkali metal alkoxides as catalysts with addition of at least one starter molecule comprising 2 or 3 reactive hydrogen atoms in bound form or by cationic polymerization using Lewis acids such as antimony pentachloride or boron fluoride etherate. Suitable alkylene oxides are, for example, tetrahydrofuran, 1,3-propylene oxide, 1,2- or 2,3-butylene oxide and preferably ethylene oxide and 1,2-propylene oxide. It is also possible to use multimetal cyanide compounds, known as DMC catalysts as catalysts. The alkylene oxides can be used individually, alternately in succession or as mixtures. Preference is given to mixtures of 1,2-propylene oxide and ethylene oxide, with the ethylene oxide being used in amounts of from 10 to 50% as ethylene oxide end block ("EO cap"), so that the polyols formed have more than 70% primary OH end groups.

Possible starter molecules are water and dihydric and trihydric alcohols such as ethylene glycol, 1,2- and 1,3-propanediol, diethylene glycol, dipropylene glycol, 1,4-butanediol, glycerol or trimethylolpropane.

The polyether polyols, preferably polyoxypropylene-polyoxyethylene polyols, preferably have a functionality of from 2 to 3 and molecular weights of from 1000 to 8000 g/mol, preferably from 2000 to 6000 g/mol.

Polyester polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Examples of possible dicarboxylic acids are: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used either individually or in a mixture with one another. In place of the free dicarboxylic acids, it is also possible to use the corresponding dicarboxylic acid derivatives, e.g. dicarboxylic esters of alcohols having from 1 to 4 carbon atoms or dicarboxylic anhydrides. Preference is given to using dicarboxylic acid mixtures of succinic, glutaric and adipic acid in weight ratios of, for example, 20-35:35-50:20-32, and in particular adipic acid. Examples of dihydric and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol and 1,6-hexanediol. Furthermore, it is possible to use polyester polyols derived from lactones, e.g. $\epsilon$-caprolactone, or hydroxycarboxylic acids, e.g. $\omega$-hydroxycaproic acid.

To prepare the polyester polyols, the organic, e.g. aromatic and preferably aliphatic, polycarboxylic acids and/or derivatives and polyhydric alcohols can be polycondensed in the absence of catalysts or preferably in the presence of esterification catalysts, advantageously in an atmosphere of inert gas, e.g. nitrogen, carbon monoxide, helium, argon, etc., in the melt at temperatures of from 150 to 250° C., preferably from 180 to 220° C., if appropriate under reduced pressure, to the desired acid number which is preferably less than 10, particularly preferably less than 2. In a preferred embodiment, the esterification mixture is polycondensed at the abovementioned temperatures to an acid number of from 80 to 30, preferably from 40 to 30, under atmospheric pressure and subsequently under a pressure of less than 500 mbar, preferably from 50 to 150 mbar. Possible esterification catalysts are, for example, iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene to distil off the water of condensation azeotropically. To prepare the polyester polyols, the organic polycarboxylic acids and/or derivatives and polyhydric alcohols are advantageously polycondensed in a molar ratio of 1:1-1.8, preferably 1:1.05-1.2.

The polyester polyols obtained preferably have a functionality of from 2 to 4, in particular from 2 to 3, and a molecular weight of from 480 to 3000 g/mol, preferably from 1000 to 3000 g/mol.

Further suitable relatively high molecular weight compounds b) having at least two hydrogen atoms which are reactive toward isocyanate are polymer-modified polyols, preferably polymer-modified polyesterols or polyetherols, particularly preferably graft polyetherols or graft polyesterols, in particular graft polyetherols. These are polymer polyols which usually have a content of preferably thermoplastic polymers of from 5 to 60% by weight, preferably from 10 to 55% by weight, particularly preferably from 30 to 55% by weight and in particular from 40 to 50% by weight. These polymer polyesterols are described, for example, in WO 05/098763 and EP-A-250 351 and are usually prepared by free-radical polymerization of suitable olefinic monomers, for example styrene, acrylonitrile, (meth)acrylates, (meth) acrylic acid and/or acrylamide, in a polyesterol serving as graft base. The side chains are generally formed by transfer of free radicals from growing polymer chains to polyesterols or polyetherols. The polymer polyol comprises not only the graft copolymer but also predominantly the homopolymers of the olefins, dispersed in unchanged polyesterol or polyetherol.

In a preferred embodiment, acrylonitrile, styrene, acrylonitrile and styrene, particularly preferably exclusively styrene, are used as monomers. The monomers are, if appropriate, polymerized in the presence of further monomers, a macromer, a moderator and a free-radical initiator, usually azo or peroxide compounds, in a polyesterol or polyetherol as continuous phase. This process is described, for example, in DE 111 394, U.S. Pat. Nos. 3,304,273, 3,383,351, 3,523,093, DE 1 152 536 and DE 1 152 537.

During the free-radical polymerization, the macromers are incorporated into the copolymer chain. This results in formation of block copolymers having a polyester or polyether block and a polyacrylonitrile-styrene block which act as phase compatibilizer at the interface of continuous phase and dispersed phase and suppress agglomeration of the polymer polyesterol particles. The proportion of macromers is usually from 1 to 20% by weight, based on the total weight of the monomers used for preparing the polymer polyol.

If the relatively high molecular weight compound b) comprises polymer polyol, the polymer polyol is preferably present together with further polyols, for example polyetherols, polyesterols or mixtures of polyetherols and polyesterols. The proportion of polymer polyol is particularly preferably greater than 5% by weight, based on the total weight of the component (b). The polymer polyols can be comprised, for example, in an amount of from 7 to 90% by weight or from 11 to 80% by weight, based on the total weight of the component (b). The polymer polyol is particularly preferably a polymer polyesterol or polymer polyetherol.

In addition, blowing agents (c) are present in the production of integral polyurethane foams. These blowing agents c) can comprise water. Apart from water, it is also possible to use generally known chemically and/or physically acting compounds as blowing agents (c). For the purposes of the present invention, chemical blowing agents are compounds which react with isocyanate to form gaseous products, for example water or formic acid. Physical blowing agents are compounds which are dissolved or emulsified in the starting materials for polyurethane production and vaporize under the conditions of polyurethane formation. These are, for example, hydrocarbons, halogenated hydrocarbons and other compounds such as perfluorinated alkanes, e.g. perfluorohexane, chlorofluorocarbons and ethers, esters, ketones, acetals or mixtures thereof, for example (cyclo)aliphatic hydrocarbons having from 4 to 8 carbon atoms or chlorofluorocarbons such as Solkane® 365 mfc from Solvay Fluorides LLC. In a preferred embodiment, a mixture comprising at least one of these blowing agents and water is used as blowing agent. In particular, water is used as sole blowing agent. If no water is used as blowing agent, preference is given to using exclusively physical blowing agents.

In a preferred embodiment, the water content is from 0.1 to 2% by weight, preferably from 0.2 to 1.5% by weight, particularly preferably from 0.3 to 1.2% by weight, in particular from 0.4 to 1% by weight, based on the total weight of the components (a) to (g).

In a further preferred embodiment, hollow microspheres comprising physical blowing agent are added as additional blowing agent in the reaction of the components (a) to (e) and, if appropriate, (f) and (g). The hollow microspheres can also be used in a mixture with the abovementioned blowing agents.

The hollow microspheres usually comprise a shell of thermoplastic polymer and are filled with a liquid, low-boiling substance based on alkanes in the core. The production of such hollow microspheres is described, for example, in U.S. Pat. No. 3,615,972. The hollow microspheres generally have a diameter of from 5 to 50 μm. Examples of suitable hollow microspheres can be obtained under the trade name Expancell® from Akzo Nobel.

The hollow microspheres are generally added in an amount of from 0.5 to 5% by weight, based on the total weight of components (b), (c) and (d).

As dialkyl cyclohexanedicarboxylates d), preference is given to using dialkyl 1,2-cyclohexanedicarboxylates. The alkyl radicals of the dialkyl cyclohexanedicarboxylates d) are preferably saturated or unsaturated, straight-chain or branched aliphatic or cycloaliphatic hydrocarbons each having from 3 to 30 carbon atoms. If appropriate, the alkyl radicals in the dialkyl cyclohexanedicarboxylate can also be joined by a covalent bond. The alkyl radicals are particularly preferably saturated, straight-chain aliphatic hydrocarbons each having from 5 to 20, more preferably from 7 to 15, carbon atoms. In particular, the two alkyl radicals have the same length. For example, dinonyl 1,2-cyclohexanedicarboxylate can be used as dialkyl cyclohexanedicarboxylate.

Dialkyl cyclohexanedicarboxylates d) are preferably used in amounts of from 1 to 20% by weight, particularly preferably from 2 to 15% by weight and in particular from 3 to 10% by weight, based on the total weight of the components a) to g).

Chain extenders and/or crosslinkers (e) used are substances having a molecular weight of preferably less than 500 g/mol, particularly preferably from 60 to 400 g/mol, with chain extenders having two hydrogen atoms which are reactive toward isocyanates and crosslinkers having three hydrogen atoms which are reactive toward isocyanate. These can be used individually or preferably in the form of mixtures. Preference is given to using diols and/or triols having molecular weights of less than 400, particularly preferably from 60 to 300 and in particular from 60 to 150. Possible chain extenders/crosslinkers are, for example, aliphatic, cycloaliphatic and/or araliphatic diols having from 2 to 14, preferably from 2 to 10, carbon atoms, e.g. ethylene glycol, 1,3-propanediol, 1,10-decanediol, 1,2-, 1,3-, 1,4-dihydroxycyclohexane, diethylene glycol, dipropylene glycol and preferably 1,4-butanediol, 1,6-hexanediol and bis(2-hydroxyethyl)hydroquinone, triols such as 1,2,4-, 1,3,5-trihydroxycyclohexane, glycerol and trimethylolpropane, and low molecular weight hydroxyl-comprising polyalkylene oxides based on ethylene oxide and/or 1,2-propylene oxide and the abovementioned diols and/or triols as starter molecules. Particular preference is given to using monoethylene glycol, 1,4-butanediol, glycerol or mixtures thereof as chain extenders (c).

If chain extenders, crosslinkers or mixtures thereof are employed, they are advantageously used in amounts of from 1 to 60% by weight, preferably from 1.5 to 50% by weight and in particular from 2 to 40% by weight, based on the weight of the components (b) and (e).

As catalysts (f) for producing the polyurethane foams, preference is given to using compounds which strongly accelerate the reaction of the hydroxyl-comprising compounds of the component (b) and, if appropriate, (e) with the organic, optionally modified polyisocyanates (a). Mention may be made of, for example, amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, bis(dimethylaminoethyl) ether, bis(dimethylaminopropyl) urea, dimethylpiperazine, 1,2-dimethylimidazole, 1-azabicyclo-[3.3.0]octane and preferably 1,4-diazabicyclo-[2.2.2]octane and alkanolamine compounds such as triethanolamine, triisopropanolamine, N-methyldiethanolamine and N-ethyldiethanolamine and dimethylethanolamine. It is likewise possible to use organic metal compounds, preferably organic tin compounds such as tin(II) salts of organic carboxylic acids, e.g. tin(II) acetate, tin(II) octoate, tin(II) ethylhexoate and tin(II) laurate, and the dialkyltin(IV) salts of organic carboxylic acids, e.g. dibutyltin diacetate, dibutyltin dilaurate, dibutyltin maleate and dioctyltin diacetate, and also bismuth carboxylates such as bismuth(III) neodecanoate, bismuth 2-ethylhexanoate and bismuth octanoate, or mixtures thereof. The organic metal compounds can be used either alone or preferably in combination with strongly basic amines. If component (b) is an ester, preference is given to using exclusively amine catalysts.

Preference is given to using from 0.001 to 5% by weight, in particular from 0.05 to 2% by weight, of catalyst or catalyst combination, based on the weight of the component (b).

It is also possible, if appropriate, to add auxiliaries and/or additives (g) to the reaction mixture for producing the polyurethane foams. Mention may be made of, for example, surface-active substances, foam stabilizers, cell regulators, further mold release agents, fillers, dyes, pigments, hydrolysis inhibitors, odor-absorbing substances and fungistatic and/or bacteriostatic substances.

Possible surface-active substances are, for example, compounds which serve to aid homogenization of the starting materials and may also be suitable for regulating the cell structure. Mention may be made of, for example, emulsifiers such as sodium salts of castor oil sulfates or of fatty acids and also fatty acid salts of amines, e.g. diethylamine oleate, diethanolamine stearate, diethanolamine ricinoleate, salts of sulfonic acids, e.g. alkali metal or ammonium salts of dodecylbenzenesulfonic or dinaphthylmethanedisulfonic acid, and ricinoleic acid; foam stabilizers such as siloxane-oxalkylene copolymers and other organopolysiloxanes, oxethylated alkylphenols, oxethylated fatty alcohols, paraffin oils, castor oil or ricinoleic esters, Turkey red oil and peanut oil, and cell regulators such as paraffins, fatty alcohols and dimethylpolysiloxanes. Oligomeric acrylates having polyoxyalkylene and fluoroalkane radicals as side groups are also suitable for improving the emulsifying action, the cell structure and/or stabilizing the foam. The surface-active substances are usually used in amounts of from 0.01 to 5 parts by weight per 100 parts by weight of the component (b).

Suitable further mold release agents are, for example: reaction products of fatty acid esters with polyisocyanates, salts of polysiloxanes comprising amino groups and of fatty acids, salts of saturated or unsaturated (cyclo)aliphatic carboxylic acids having at least 8 carbon atoms and tertiary amines and also, in particular, internal mold release agents such as carboxylic esters and/or carboxamides prepared by esterification or amidation of a mixture of montanic acid and at least one aliphatic carboxylic acid having at least 10 carbon atoms with at least bifunctional alkanolamines, polyols and/or polyamines having molecular weights of from 60 to 400 g/mol, as disclosed, for example, in EP 153 639, mixtures of organic amines, metal salts of stearic acid and organic monocarboxylic and/or dicarboxylic acids or their anhydrides, as disclosed, for example, in DE-A-3 607 447, or mixtures of an imino compound, the metal salt of a carboxylic acid and, if appropriate, a carboxylic acid, as disclosed, for example, in U.S. Pat. No. 4,764,537. Reaction mixtures according to the invention preferably do not comprise any further mold release agents.

For the purposes of the present invention, fillers, in particular reinforcing fillers, are the customary organic and inorganic fillers, reinforcing materials, weighting agents, coating agents, etc., known per se. Specific examples which may be mentioned are: inorganic fillers such as siliceous minerals, for example sheet silicates such as antigorite, bentonite, serpentine, hornblendes, amphiboles, chrysotile and talc, metal oxides such as kaolin, aluminum oxides, titanium oxides, zinc oxide and iron oxides, metal salts such as chalk and barite, and inorganic pigments such as cadmium sulfide, zinc sulfide and also glass, etc. Preference is given to using kaolin (china clay), aluminum silicate and coprecipitates of barium sulfate and aluminum silicate and also natural and synthetic fibrous minerals such as Wollastonite, metal fibers and in particular glass fibers of various lengths, which may, if appropriate, be coated with a size. Possible organic fillers are, for example: carbon black, melamine, rosin, cyclopentadienyl resins and graft polymers and also cellulose fibers, polyamide fibers, polyacrylonitrile fibers, polyurethane fibers, polyester fibers based on aromatic and/or aliphatic dicarboxylic esters and in particular carbon fibers.

The inorganic and organic fillers can be used individually or as mixtures and are advantageously added to the reaction mixture in amounts of from 0.5 to 50% by weight, preferably from 1 to 40% by weight, based on the weight of the components (a) to (c), although the content of matts, nonwovens and woven fabrics of natural and synthetic fibers can reach values of up to 80% by weight.

To produce an integral polyurethane foam according to the invention, the components (a) to (g) are mixed with one another in such amounts that the equivalence ratio of NCO groups of the polyisocyanates (a) to the sum of the reactive hydrogen atoms of the components (b), (c) and (d) is from 1:0.8 to 1:1.25, preferably from 1:0.9 to 1:1.15.

The integral polyurethane foams of the invention are preferably produced by the one-shot process using the low-pressure or high-pressure technique in closed, advantageously heated molds. The molds usually comprise metal, e.g. aluminum or steel. These processes are described, for example, by Piechota and Röhr in "Integralschaumstoff", Carl-Hanser-Verlag, Munich, Vienna, 1975, or in "Kunststoffhandbuch", volume 7, Polyurethane, 3rd edition, 1993, chapter 7.

The starting components (a) to (g) are, for this purpose, preferably mixed at a temperature of from 15 to 90° C., particularly preferably from 25 to 55° C., and the reaction mixture is introduced into the closed mold, if appropriate under superatmospheric pressure. Mixing can be carried out mechanically by means of a stirrer or a stirring screw or under high pressure in a countercurrent injection process. The mold temperature is advantageously from 20 to 160° C., preferably from 30 to 120° C., particularly preferably from 30 to 60° C. For the purposes of the invention, the mixture of the components (a) to (g) at reaction conversions of less than 90%, based on the isocyanate groups, is referred to as reaction mixture.

The amount of reaction mixture introduced into the mold is calculated so that the integral foam moldings obtained have a density of preferably from 0.08 to 0.90 g/cm$^3$, particularly preferably from 0.15 to 0.80 g/cm$^3$ and in particular from 0.25 to 0.70 g/cm$^3$. The degrees of compaction for producing the integral polyurethane foams of the invention are in the range from 1.1 to 8.5, preferably from 2.1 to 7.0.

The present invention further provides an integral polyurethane foam which can be obtained by a process according to the invention. Such integral polyurethane foams according to the invention are preferably used as shoe soles, for example for street shoes, sports shoes, sandals and boots, and also in the interior of road vehicles, for example in cars as steering wheels, headrests or transmission knobs or as chair arm rests. Further possible uses are as arm rest for chairs or as motor cycle saddles. Integral polyurethane foams according to the invention are particularly preferably used as shoe soles or in automobile interiors.

The present invention further provides for the use of the dialkyl cyclohexanedicarboxylates described under f) as internal mold release agents in the production of integral polyurethane foams.

The invention is illustrated below with the aid of examples.

The A component and the B component were prepared as indicated in table 1 and were subsequently mixed with one another at an isocyanate index of 100 and introduced into a closed mold so that moldings having an average density of 550 g/l were obtained.

TABLE 1

|  | C 1 | C 2 | C 3 | C 4 | Example 1 |
|---|---|---|---|---|---|
| A component |  |  |  |  |  |
| Polyol 1 | 79.47 | 86.47 | 88.47 | 82.47 | 86.47 |
| Monoethylene glycol | 6.5 | 6.5 | 6.5 | 6.5 | 6.5 |
| Catalyst | 1.7 | 1.7 | 1.7 | 1.7 | 1.7 |
| Antistatic | 2 | 2 | 2 | 2 | 2 |
| Water | 0.33 | 0.33 | 0.33 | 0.33 | 0.33 |
| IMR 1 | 10 | 0 | 0 | 0 | 0 |
| IMR 2 | 0 | 3 | 0 | 0 | 0 |
| IMR 3 | 0 | 0 | 1 | 0 | 0 |
| IMR 4 | 0 | 0 | 0 | 3 | 0 |
| IMR 5 | 0 | 0 | 0 | 0 | 7 |
| Total A component | 100 | 100 | 100 | 100 | 100 |
| B component (NCO content = 16%) |  |  |  |  |  |
| 4,4-MDI | 49 | 49 | 49 | 49 | 49 |
| Uretonimine-modified MDI | 4 | 4 | 4 | 4 | 4 |
| Polyol 2 | 29 | 29 | 29 | 29 | 29 |

TABLE 1-continued

|  | C 1 | C 2 | C 3 | C 4 | Example 1 |
|---|---|---|---|---|---|
| Polyol 3 | 10 | 10 | 10 | 10 | 10 |
| γ-Butyrolactone | 7 | 7 | 7 | 7 | 7 |
| Diethyloxalate | 1 | 1 | 1 | 1 | 1 |
| Total B component | 100 | 100 | 100 | 100 | 100 |

Polyol 1: Polyesterol based on adipic acid, monoethylene glycol and diethylene glycol; weight average molecular weight = 2000 g/mol
Polyol 2: Polyesterol based on adipic acid, monoethylene glycol and 1,4-butanediol; weight average molecular weight = 2000 g/mol
Polyol 3: Polyesterol based on adipic acid, monoethylene glycol, diethylene glycol and trimethylolpropane; weight average molecular weight = 2500 g/mol
Catalyst: 33% by weight of tetraethylenediamine in monoethylene glycol
Antistatic: Ammonium salt in monoethylene glycol
IMR 1: Internal mold release agent Radia ® 7171 from Oleon, ester of oleic acid and pentaerythritol, recommended addition: from 8 to 12% by weight of the A component
IMR 2: Internal mold release agent, amide of oleic acid and aliphatic amines, recommended addition: from 2 to 4% by weight of the A component
IMR 3: Internal mold release agent Dow Corning ® 1248 Fluid from Dow Corning, dimethylsiloxane functionalized by grafting on of glycol, recommended addition: from 1 to 2% by weight of the A component
IMR 4: Epoxidized soybean oil, recommended addition: from 2 to 4% by weight of the A component
IMR 5: Hexamoll DINCH ® from BASF AG, diisononyl cyclohexanedicarboxylate The hardness in accordance with DIN 53505 and the tensile strength and the elongation at break in accordance with DIN 53504 were measured on the integral polyurethane foams obtained in this way both before and after hydrolytic aging of the integral foam at 70° C. and 95% relative humidity for 7 days. The data obtained and the cell structure in the core of the foams and the maximum number of removals from the mold without further addition of external mold release agent are reported in table 2. For these measurements, an external mold release agent was introduced once into a cleaned mold. Test plates were subsequently produced without further addition of external mold release agent and the number of test plates which could be produced without adhesion was determined.

TABLE 2

|  | C 1 | C 2 | C 3 | C 4 | Example 1 |
|---|---|---|---|---|---|
| Hardness (Shore A) | 43 | 43 | not measurable | 42 | 45 |
| Hardness after hydrolysis | 41 | 35 | not measurable | 40 | 44 |
| Tensile strength [N/mm2] | 5 | 5.2 | not measurable | 4.8 | 5.4 |
| Tensile strength after hydrolysis [N/mm2] | 5.5 | 3.5 | not measurable | 4.5 | 6.4 |
| Elongation at break [%] | 470 | 480 | not measurable | 370 | 490 |
| Elongation at break after hydrolysis [%] | 520 | 370 | not measurable | 420 | 532 |
| Cell structure | coarse | fine | very coarse, poor skin formation | fine | fine, very homogeneous |
| max. number of removals from the mold | 4 | 2 | 2 | 1 | 4 |

When silicone was used as mold release agent, the mechanical properties of the foam could not be determined because of the poor foam structure. Foams produced using epoxidized soybean oil as mold release agent do display the desired fine cell structure, but only one removal from the mold is possible without use of additional external mold release agent when this internal mold release agent is used and the molding obtained is fragile. This is made clear, in particular, by the poor values for the tensile strength and elongation at break. Esters of oleic acid and pentaerythritol display acceptable mechanical values before and after hydrolytic aging but have an undesirable, coarse cell structure. The use of amides derived from oleic acid and aliphatic amines as internal mold release agent leads to moldings having very poor mechanical properties after hydrolytic aging. When diisononyl cyclohexanedicarboxylate is used as internal mold release agent, moldings having a very fine and homogeneous cell structure and excellent mechanical properties both before and after hydrolytic aging are obtained. Furthermore, diisononyl cyclohexanedicarboxylate displays very good release properties.

The invention claimed is:

1. A process for producing an integral polyurethane foam, comprising:
mixing an organic polyisocyanate with at least one compound having at least two reactive hydrogen atoms selected from the group consisting of a polyetherol, a polyesterol and a polymer-modified polyol, a blowing agent, a dialkyl cyclohexane-dicarboxylate and, optionally, one or more selected from the group consisting of a chain extender, a crosslinker, a catalyst and other auxiliaries and additives to form a reaction mixture;
introducing the reaction mixture into a mold;
and reacting the reaction mixture to form the integral polyurethane foam.

2. The process according to claim 1, wherein the dialkyl cyclohexanedicarboxylate is a dialkyl 1,2-cyclohexanedicarboxylate.

3. The process according to claim 1, wherein alkyl radicals in the dialkyl cyclohexanedicarboxylate each comprise from 3 to 30 carbon atoms.

4. An integral polyurethane foam obtained by a process according to claim 1.

5. An interior of a road vehicle comprising the integral polyurethane foam according to claim 4.

6. A shoe sole comprising the integral polyurethane foam according to claim 4.

7. The process for producing an integral polyurethane foam according to claim 1, wherein the compound having at least two reactive hydrogen atoms is a polyether polyol and a molecular weight of the polyether polyol is from 1000 to 8000 g/mol.

8. The process for producing an integral polyurethane foam according to claim 1, wherein the compound having at least two reactive hydrogen atoms is a polyester polyol and a molecular weight of the polyester polyol is from 480 to 3000 g/mol.

9. The process for producing an integral polyurethane foam according to claim 1, wherein the compound having at least two reactive hydrogen atoms is a polymer modified polyol selected from the group consisting of graft polyetherols and graft polyesterols.

10. The process for producing an integral polyurethane foam according to claim 9, wherein the compound having at least two reactive hydrogen atoms is a graft polyetherol which is a block copolymer comprising a polyether block and a polyacrylonitrile-styrene block.

11. The process for producing an integral polyurethane foam according to claim 9, wherein the compound having at least two reactive hydrogen atoms is a graft polyesterol which is a block copolymer comprising a polyester block and a polyacrylonitrile-styrene block.

12. The process for producing an integral polyurethane foam according to claim 1, wherein the dialkyl cyclohexane-dicarboxylate is dinonyl 1,2-cyclohexane-dicarboxylate.

13. The process for producing an integral polyurethane foam according to claim 1, wherein a content of the dialkyl cyclohexane-dicarboxylate is from 1 to 20% by weight of the reaction mixture.

\* \* \* \* \*